(12) United States Patent
Luo et al.

(10) Patent No.: US 7,760,808 B2
(45) Date of Patent: Jul. 20, 2010

(54) IMAGE PROCESSING OF DCT-BASED VIDEO SEQUENCES IN COMPRESSED DOMAIN

(75) Inventors: Jiangcong Luo, Arlington, TX (US); Fehmi Chebil, Irving, TX (US); Asad Islam, Richardson, TX (US)

(73) Assignee: Nokia Corporation, Espoo (FI)

(*) Notice: Subject to any disclaimer, the term of this patent is extended or adjusted under 35 U.S.C. 154(b) by 1379 days.

(21) Appl. No.: 11/159,392

(22) Filed: Jun. 21, 2005

(65) Prior Publication Data

US 2006/0285587 A1 Dec. 21, 2006

(51) Int. Cl.
- H04N 7/12 (2006.01)
- H04N 11/02 (2006.01)
- H04N 11/04 (2006.01)
- G06K 9/00 (2006.01)
- G06K 9/36 (2006.01)
- G06K 9/46 (2006.01)

(52) U.S. Cl. ............ 375/240.2; 382/100; 382/232; 375/240.25; 375/240.03; 375/240.01

(58) Field of Classification Search ............ 375/240
See application file for complete search history.

(56) References Cited

U.S. PATENT DOCUMENTS

| | | |
|---|---|---|
| 6,452,969 B1 | 9/2002 | Yim |
| 6,633,673 B1 | 10/2003 | Shen |
| 6,785,335 B1 * | 8/2004 | Layeghi .............. 375/240.2 |
| 6,891,892 B2 * | 5/2005 | Yang ................. 375/240.25 |
| 2002/0057739 A1 * | 5/2002 | Hasebe et al. ........ 375/240.01 |
| 2002/0141496 A1 | 10/2002 | Yang |
| 2003/0133590 A1 * | 7/2003 | Miller et al. ............. 382/100 |
| 2005/0129111 A1 | 6/2005 | Kurceren |

FOREIGN PATENT DOCUMENTS

EP  1005229  5/2000

OTHER PUBLICATIONS

Dongjiang Qiao et al; "Antenna Impedance Mismatch Measurement and Correction for Adaptive CDMA Transceivers;" IEEE (2005); entire document.

V. Bhaskaran; "Mediaprocessing in the compressed domain;" Digest of Papers; COMPCON 96; Technologies for the Information Superhighway; Feb. 25-28, 1996, Los Alamitos, CA; pp. 204-209; Section 2.1 on p. 205- 206; Figures 1 and 2B and Abstract.

(Continued)

*Primary Examiner*—Marsha D Banks Harold
*Assistant Examiner*—Hee-Yong Kim
(74) *Attorney, Agent, or Firm*—Alfred A. Fressola; Ware, Fressola, Van Der Sluys & Adolphson LLP

(57) ABSTRACT

This invention relates to a method for applying at least one of contrast adjustment and brightness adjustment to a compressed, motion compensated DCT-based video sequence corresponding to an image processing operation, comprising the steps of providing the compressed, motion compensated DCT-based video sequence, applying the image processing operation on the video sequence in compressed domain resulting in an image processed, compressed video sequence, wherein the applying is executed by adjusting of DCT-components defining the DCT-based video sequence.

16 Claims, 5 Drawing Sheets

(Spatial domain video enhancement process)

OTHER PUBLICATIONS

J. Tang, et al; "Image enhancement using contrast measure in the compressed domain;" IEEE Signal Processing Letters; Oct. 2003; vol. 10, No. 10; pp. 289-292; p. 289, col. 2, lines 34-44 and Abstract.

A. Kebin, et al; "A brightness adjustment method for MPEG-2 compressed video editing;" 2006 Digest of Technical Papers; IEEE International Conference on Consumer Electronics; Jan. 7-11, 2006; pp. 311-312; whole document.

C. Fehmi, et al; "Compressed domain editing of JPEG2000 images;" IEEE Transactions on Consumer Electronics; vol. 51, No. 2; May 2005; pp. 710-717; whole document.

* cited by examiner

Fig. 2 (Spatial domain video enhancement process)

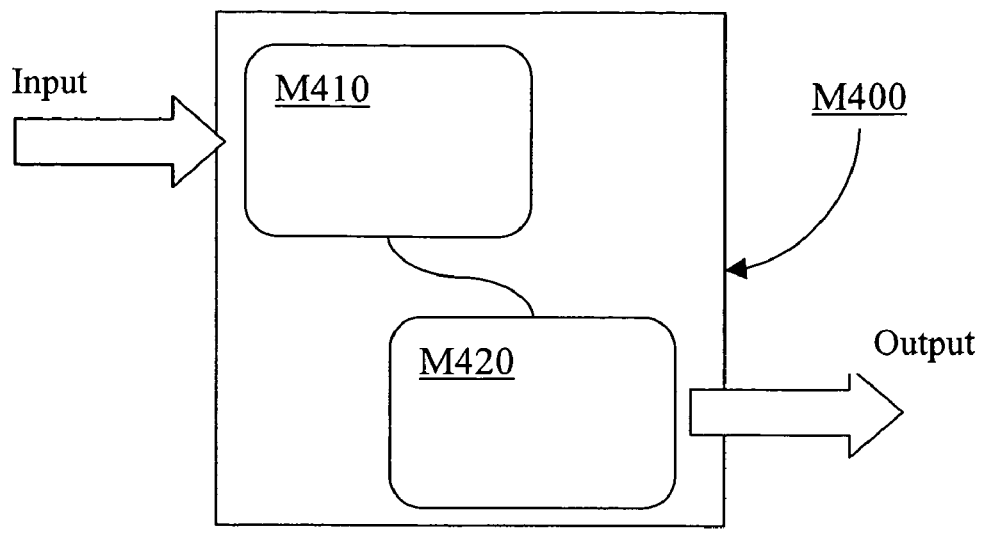
Fig. 4 (Module)

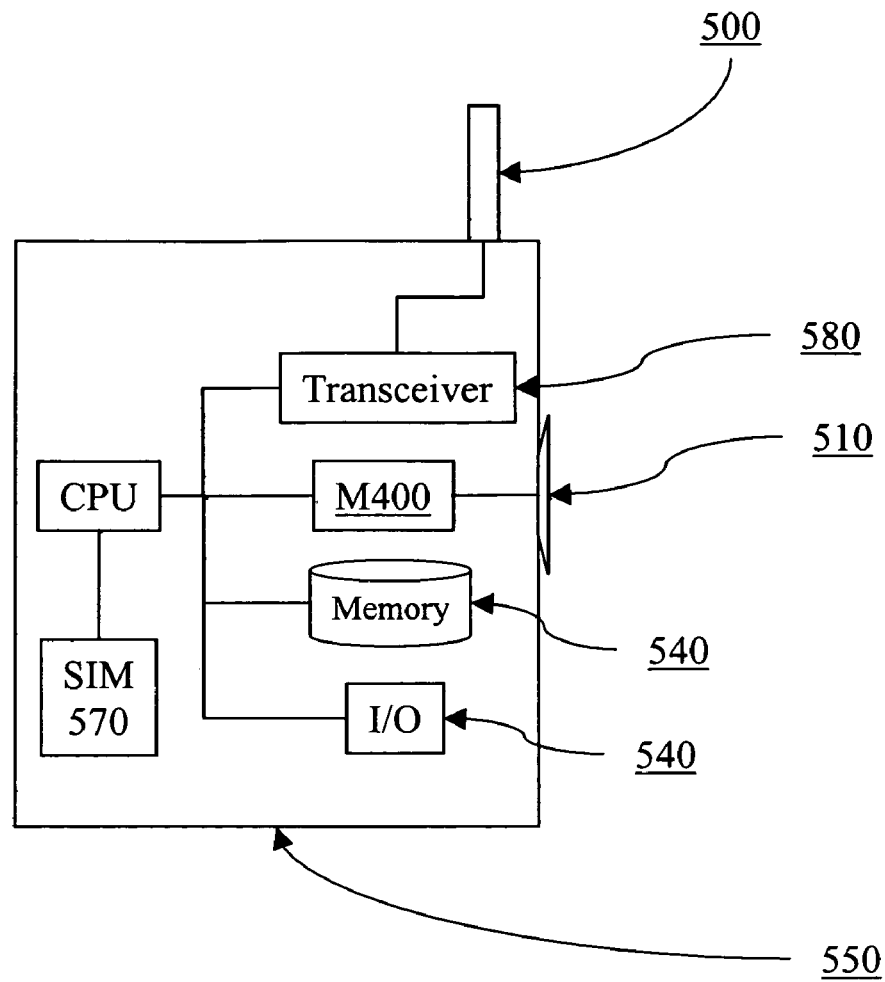
Fig. 5 (Device)

IMAGE PROCESSING OF DCT-BASED VIDEO SEQUENCES IN COMPRESSED DOMAIN

FIELD OF THE INVENTION

The present invention relates to the field of image processing of video data, particularly in compressed domain.

BACKGROUND OF THE INVENTION

Digital video cameras are increasingly spreading on the marketplace. The latest mobile phones are equipped with video cameras offering users the capabilities to shoot video clips and send them over wireless networks.

Digital video sequences are very large in file size. Even a short video sequence is composed of tens of images. As a result video is always saved and/or transferred in compressed form. There are several video-coding techniques that can be used for that purpose. H.263 and MPEG-4 are the most widely used standard compression formats suitable for wireless cellular environments.

To allow users to generate quality video at their terminals, it is imperative that devices having video camera, such as mobile phones, provide video editing capabilities. Video editing is the process of transforming and/or organizing available video sequences into a new video sequence.

Existing cameras on mobile phones are not comparable in performance to the most sophisticated digital cameras available in the market. As a result, video captured from such cameras usually suffers from calibration that results in degraded brightness and contrast levels, as well as deficient color balance. As a result, among the most widely needed operations in video editing is the enhancement of the visual perceptual quality of video. This includes adjusting the brightness and contrast levels of the video clip.

Adjusting the brightness and contrast of a still image requires changing the image coefficients, which is usually done in the spatial domain. For constrained mobile devices, adjusting the brightness or contrast of a video (which comprises of hundreds of frames) is very costly and taxing on the system resources. This becomes an even bigger concern when we consider that the user may experiment with the adjustment level many times before achieving the desired result.

Most video editing tools enable users to apply image enhancement effects on the image. An example is to increase or decreases the brightness when the original video is too dark or too bright. In the video editing tools, similar operations are required to produce a better representation of the video clips.

Several commercial products support such features, but they are mainly targeted for the PC platform. These products adopt a straightforward approach by applying the video enhancement effects in spatial domain. More specifically, they first decompress the video clips to their raw format, then manipulate the pixel values of the raw image sequences, and finally compress the enhanced raw image sequences into the compressed bitstream. This process is called spatial domain video editing.

Spatial domain video editing, however, consumes a large number of resources, including memory, storage, and computational power. Although, this is not such a big issue for today's desktop PCs, but it is definitely a problem for mobile devices that are equipped with low-power processors and low memory and storage resources. The decoding and encoding process takes a long time and consumes a lot of battery power in these devices. The spatial domain scheme, therefore, is not a viable solution for mobile devices.

In prior art, to perform brightness or contrast adjustment on video clips, the video clips are first decoded to the raw format. Then, the raw image sequences are adjusted to the designated brightness or contrast level. Finally, the enhanced raw image sequences are encoded again. This approach is significantly computational intensive, especially the encoding part.

An example of spatial domain video editing of brightness and contrast adjustment is given below, with reference to FIG. 2.

The brightness adjustment refers to the cases of increasing or decreasing the luminance intensity of the video clip by a constant value. The contrast adjustment refers to the cases of stretching the difference between luminance intensities within a frame.

To achieve these brightness and contrast adjustments in the spatial domain, once the video is fully decoded, the following operation is performed:

$$\tilde{V}(x,y,t) = V(x,y,t) + K \quad (1)$$

$$\tilde{V}(x,y,t) = \lambda \cdot [V(x,y,t) - \eta] + \eta \quad (2)$$

where (1) represents the brightness adjustment and (2) represents the contrast adjustment, $V(x,y,t)$ is the decoded video sequence, $\tilde{V}(x,y,t)$ is the edited video, x, y are the spatial coordinates of the pixels in the frames and t is the temporal axis. K is the brightness adjusting value, which is constant for all pixels in the frame. A positive value of K will make the video brighter, while a negative value of K will make the video darker. $\lambda > 0$ is the stretching factor for contrast adjustment, which is constant for all pixels in the frame. If $\lambda$ is larger than 1, the resulting video has a higher contrast level, while if $\lambda$ is between 0 and 1, the resulting video has a lower contrast level. A value of $\lambda = 1$ does not result in any change in the image. $\eta$ represents the mean of pixel intensities in a particular frame. Equation (2) shows that for the contrast adjustment the pixel intensities are uniformly stretched; the stretch centre is the mean of the pixel intensities.

After modifying the pixel values of a video frame, the resulting frame is fed to the encoder for re-encoding, which is a time consuming process.

SUMMARY OF THE INVENTION

The object of the present invention is to provide a methodology and a device for image processing of a discrete cosine transform (DCT)-based video sequence, which overcomes the deficiencies of the state of the art.

This invention provides a technique for performing enhancements on video sequences in compressed domain. Performing the adjustments in compressed domain solves the computational cost problem associated with mobile devices. The video enhancement operations that can be achieved with this technique may include increasing or decreasing the brightness and increasing or decreasing the contrast and shadow compensation as well.

The objects of the present invention are solved by the subject matter defined in the accompanying independent claims.

According to a first aspect of the present invention, a method for applying at least one of contrast adjustment and brightness adjustment to a compressed, motion compensated DCT-based video sequence is provided. Said method generally comprises steps of: providing said compressed DCT-based video sequence and applying an image processing operation on said video sequence in compressed domain resulting in an image processed, compressed video sequence.

Image manipulation in compressed domain in accordance with the present invention provides an effective technique which allows image enhancement in compressed domain and also computational power saving. However, the steps of decoding and coding of a digital video sequence are avoided.

According to another embodiment of the present invention said applying is executed by adjusting of DCT-components defining said DCT-based video sequence. Thereby an advantageous connection between the spatial domain and the DCT-domain is provided. Hence, by adjusting DCT-components an image manipulation in spatial domain is achieved.

According to another embodiment of the present invention said adjusting of DCT-components is provided by partial decoding and encoding of said DCT-based video sequence. However, sometimes partial encoding and decoding is needed for proper image manipulation of the DCT-based video sequence.

According to another embodiment of the present invention said applying enables contrast adjustment of said DCT-based video sequence. By performing contrast adjustment a user is able to enhance or modify the video sequence. Thereby a convenient handling of image data in accordance with the present invention is reached.

According to another embodiment of the present invention said contrast adjustment is based on the following expression:

$$Y'(n, m) = \begin{cases} \lambda \cdot Y(n, m) + (\lambda - 1) \cdot \overline{Y_{DC}} & m = n = 0 \\ \lambda \cdot Y(n, m) & m \neq 0 \text{ or } n \neq 0 \end{cases}$$

where:
m,n are frequency domain coordinates;
Y'(n,m) is the DCT transformation of the edited image;
$\lambda$ is a contrast scaling factor;
Y(n,m) is the DCT transformation of the original image;
$\overline{Y_{DC}}$ is the average of the direct current (DC) coefficients of all blocks within the image.

According to another embodiment of the present invention said applying enables brightness adjustment of said DCT-based video sequence. By performing brightness adjustment a user is able to enhance or modify the video sequence. Thereby a convenient handling of image data in accordance with the present invention is reached.

According to another embodiment of the present invention said brightness adjustment is based on the following expression:

$$Y'_q(n, m) = \begin{cases} Y_q(n, m) + 8 \cdot K / Q_{DC}; & m = n = 0 \\ Y_q(n, m); & \text{else} \end{cases}$$

wherein K' corresponds to the value of the brightness adjustment in the compressed domain and it is given by:

$$K' = \begin{cases} 8 \cdot K / Q_{DC}; & m = n = 0 \\ 0; & \text{else} \end{cases}$$

where:
m,n are frequency domain coordinates;
$Y_q'(n,m)$ is the DCT transformation of the edited image;
$Y_q(n,m)$ is the DCT transformation of the original image;
$Q_{DC}$ is the quantization scale for DC coefficient.

According to another embodiment of the present invention shadow effect compensation is provided on the basis of said applying of said image processing of said DCT-based video sequence. Thus an additional image enhancement operation may be processed.

According to another embodiment of the present invention said shadow compensation is provided by compensating residuals when out-of-range pixels are detected in a previous frame. This methodology provides an advantageous method for detecting and compensating shadowing effects within the video sequence.

According to another embodiment of the present invention said out-of-range pixels are detected in the DCT-based video sequence by setting thresholds for DC and alternating current (AC) coefficients. Thereby, handling in the compressed domain by adjusting DCT-components is provided, so that computational intensive operations for coding or decoding respectively are avoided.

According to another embodiment of the present invention said shadow effect compensation is provided by partially decoding of certain frames of said video sequence, where a possibility for out-of-bound coefficients exists. Thereby only partial decoding is needed which avoids complex and computational intensive operations.

According to another embodiment of the present invention said video sequence is a digital H.263 bit-stream representing said sequence.

According to another embodiment of the present invention the amount of change in pixel intensity is exactly the same amount of change in DC coefficient if said brightness adjustment of said sequence for intra-coded macroblocks is applied, on the basis of a H.263 bit-stream.

According to another embodiment of the present invention said video sequence is a digital mpeg-4 bit-stream representing said sequence.

According to another embodiment of the present invention said contrast adjustment in said sequence represented by said mpeg-4 bit-stream is provided as one-pass process for intra-coded macroblocks.

According to another embodiment of the present invention a computer program product for image processing of a DCT-based video sequence is provided relating to a defined environment, comprising program code sections stored on a readable medium for carrying out the steps of the previously mentioned methods, when said program is run on a computer, a microprocessor based device, a terminal, a network device, a mobile terminal, or a portable communication enabled terminal.

According to another embodiment of the present invention a computer program product for image processing of a DCT-based video sequence relating to a defined environment is provided, comprising program code sections stored on a machine-readable medium for carrying out the steps of the methods above, when said program product is run on a computer, a microprocessor based device, a terminal, a network device, a mobile terminal, or a portable communication enabled terminal.

According to another embodiment of the present invention a software tool for image processing of a DCT-based video sequence relating to a defined environment, comprising program portions for carrying out the operations of the methods above, when said program is implemented in a computer program for being executed on a microprocessor based device, processing device, a terminal device, a network device, a mobile terminal, or a portable communication enabled terminal.

According to another embodiment of the present invention a computer data signal embodied in a carrier wave and representing instructions, which when executed by a processor cause the steps of anyone of the methods above to be carried out.

According to another aspect of the present invention a module adapted for applying at least one of contrast adjustment and brightness adjustment to a compressed, motion compensated DCT-based video sequence corresponding to an image processing operation is provided. Said module comprises a component for providing said compressed DCT-based video sequence and a component for applying said image processing operation on said video sequence in compressed domain resulting to an image processed, compressed video sequence.

According to another embodiment of the present invention a mobile device adapted for applying at least one of contrast adjustment and brightness adjustment to a compressed, motion compensated DCT-based video sequence corresponding to an image processing operation is provided. Said device comprises: at least one module for image processing, an I/O interface, a memory unit, a communication interface and a CPU adapted to control all entities within said mobile device.

Advantages of the present invention will become apparent to the reader of the present invention when reading the detailed description referring to embodiments of the present invention, based on which the inventive concept is easily understandable.

Throughout the detailed description and the accompanying drawings same or similar components, units or devices will be referenced by same reference numerals for clarity purposes.

It shall be noted that the designations portable device and mobile device are used synonymously throughout the description.

BRIEF DESCRIPTION OF THE DRAWINGS

The accompanying drawings are included to provide a further understanding of the invention, and are incorporated in and constitute a part of this specification. The drawings illustrate embodiments of the present invention and together with the description serve to explain the principles of the invention. In the drawings.

FIG. 4 corresponds to a module for image processing according to the present invention; and FIG. 5 depicts a mobile device or a consumer electronic device, respectively according to the present invention.

DETAILED DESCRIPTION OF THE PREFERRED EMBODIMENTS

Figure 1:
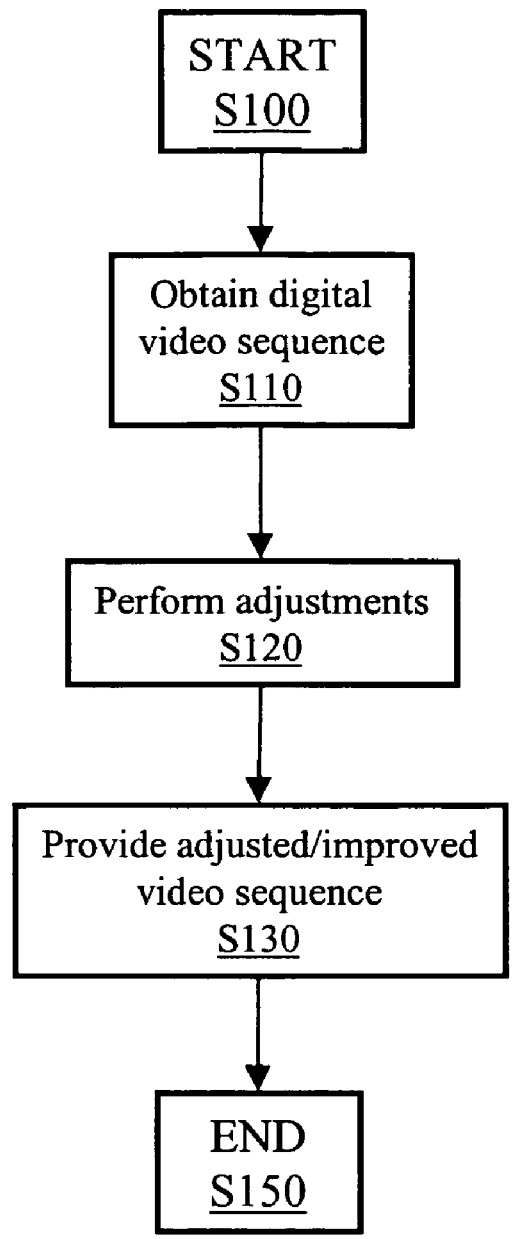
FIG. 1 shows a flow chart illustrating the principle of the method for image processing in accordance with the present invention.

With reference to FIG. 1, a flow chart illustrating the principle of the methodology in accordance with the present invention is depicted. In an operation S100 the operational sequence starts. In accordance with the aforementioned description of the inventive concept a providing or obtaining, respectively of a DCT-based video sequence is performed which is shown with reference to an operation S110. The DCT-based sequence originates from an original sequence that is obtained by means of a video camera or the like. Also imaginable is that the video sequence was previously stored in a memory.

In an operation S120 applying of an image processing operation on the compressed video sequence is provided. The theoretical background of said image processing operation will be described in detail in the following description. Said image processing operation may comprise different steps like brightness or contrast correction or according to the present invention a shadowing compensation algorithm. Advantageously all steps are provided within the compressed domain (DCT-based domain) thus no complete encoding of each images in the video sequence is necessary. After the adjusting operation S120 the new and image processed video sequence may be provided represented with reference to an operation S130, so that further processing or storing is possible.

If no further processing is carried out the method comes to an end at operation S150 and may be restarted which corresponds to a new iteration.

Figure 2:
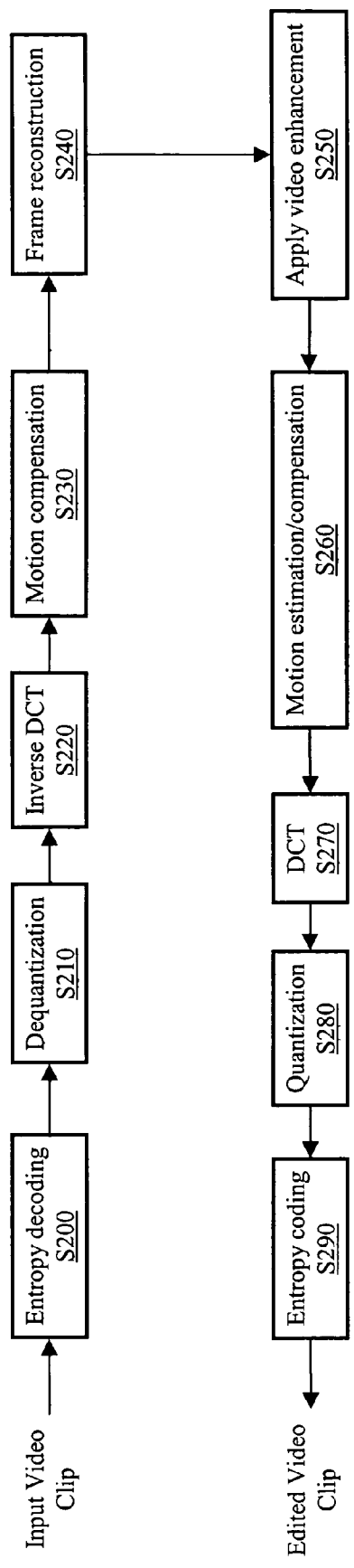
FIG. 2 shows a video enhancement or manipulating process in spatial domain in accordance with the present invention.

With reference to FIG. 2 a video adjustment system operating in the spatial domain is provided. The system has a usual DCT-transformed video clip as input and subsequently a number of operational blocks will be crossed, as shown in FIG. 2. The upper part of FIG. 2 generally symbolizes the decoding path and the lower path corresponds to the coding process so that an edited video clip at the output of said system is provided. In this particular embodiment said edited video clip will be available also in DCT or compressed form, respectively.

In a video compression system, which is depicted with reference to the lower path according to FIG. 2, both temporal and spatial redundancies are exploited. To exploit the temporal redundancy, only the changes between the consecutive frames are encoded. The motion in the current frame is estimated or predicted from the previous frame. The motion compensated or predicted frame is then subtracted from the original frame.

The process of constructing the prediction is called motion compensation S230 and S260. In most video compression systems, motion compensation is block-based. More specifically, each frame is divided into blocks (called macroblock) and a motion vector is assigned to each macroblock or block. The motion vector of a macroblock or a block points to a macroblock or a block in the previous encoded frame, which is least different from that macroblock. The process of finding these motion vectors is called motion estimation. The motion compensation process uses the previously determined motion vectors for image reconstruction or even for picture improvement, for instance. The motion compensation/estimation process is highly computational intensive, and consumes a large portion of processing time in the entire encoding process.

Spatial redundancy within a frame is exploited by applying transforms on the residual data. In a DCT-based video coding system, which is what most video compression standards use, 2D DCT transform is applied on 8×8 blocks. As a result of the DCT transform, pixel intensities are converted into DCT coefficients, which represent the energy distribution of the input block over spatial frequency. After DCT transform, the energy of the 8×8 block is highly concentrated in the low frequency coefficients while the high frequency coefficients are usually diminished. Therefore, only a few coefficients are needed to encode and transmit.

The DCT transform equation is shown below and is depicted according to S270:

$$Y(n,m) = \frac{1}{4}C_n C_m \sum_{j=0}^{7}\sum_{j=0}^{7} I(i,j) \cdot \cos\left(\frac{\pi \cdot n}{16}(2i+1)\right) \cdot \cos\left(\frac{\pi \cdot m}{16}(2j+1)\right) \quad (3)$$

$$C_k = \begin{cases} \frac{1}{\sqrt{2}} & k=0 \\ 1 & k \neq 0 \end{cases}$$

where, i,j are the spatial coordinates of a pixel in a block, n,m are the frequency domain coordinates, I is the intensity of a pixel, $C_k$ is the scaling factor, and Y(n,m) are the DCT coefficients. The lowest frequency coefficient Y(0,0) is called the DC coefficient and represents the mean intensity of the 8×8 block. The rest of the coefficients are called AC coefficients.

In the encoding process which is depicted with reference to the lower path in FIG. 2, after applying the DCT transform on each 8×8 block S270, the DCT coefficients are quantized corresponding to an operation S280. After quantization, the number of non-zero DCT coefficients is further reduced (not depicted). The non-zero coefficients are entropy encoded S290 and transmitted or provided. However a processed or edited video clip may now be further processed or stored.

In the decoding process, the reverse of the above operations (cf. encoding process) is performed. First, the bitstreams are entropy decoded depicted with reference to an operation S200 and then the DCT coefficients are dequantized as shown in an operation S210. The DCT coefficients are inverse transformed S220 to produce the residual frame. The residual is added to the reconstructed frame that is generated from the previous decoded frame to restore the uncompressed raw frame, corresponding to operations S230 and S240. Now a decoded video sequence in spatial domain may further be processed. In this exemplarily embodiment a video enhancement operation with reference to an operation S250 is provided. Said enhancement may comprise different operations like brightness or contrast adjustment or the like. Said adjusted video sequence in the spatial domain is used as input for the corresponding encoding or coding process to derive the previously mentioned edited video clip.

In the compression process, not all the blocks are coded with the residual information. Some blocks are coded with their original pixel values. This happens if, for example, the previous frame is not available or encoding the residual requires more bits than encoding the original frame. The encoding of the original pixel values is called Intra-coding, and the encoding of the residual pixel values is called Inter-coding.

Spatial domain video enhancement that requires fully decoding and re-encoding video bitstreams is highly complex since some computational intensive processes, such as motion compensation/estimation, have to be invoked. On the contrary, a compressed domain video enhancement manipulates the DCT coefficients, which avoid those complex processes. Therefore, substantial speedup can be achieved. This process or system is shown with reference to FIG. 3 describing an image processing system in compressed domain according to the inventive concept of the present invention.

The input video clip is a DCT-based video sequence. In a first operation S300 entropy decoding is provided and subsequently a dequantization operation S310 follows, as already described with reference to FIG. 2. The video enhancement operation S350 according to the present invention is processed on the dequantized coefficients resulting from the above-mentioned operation S310.

Figure 3:
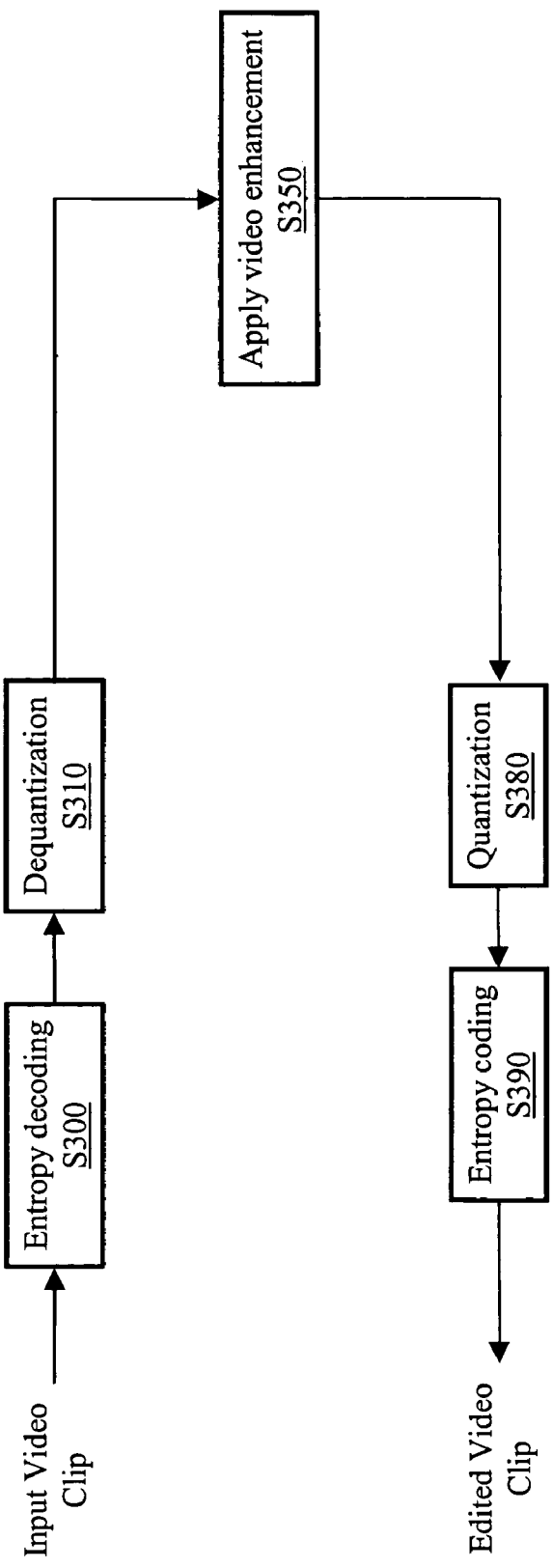
FIG. 3 shows a video manipulation process in compressed domain.

The coding path according to FIG. 3 (lower path) comprises the aforementioned operations as well: Quantization S380 and entropy coding S390. The result is an edited video clip, wherein the image processing was provided without any decompression steps in accordance with the advantage of the inventive concept of the present invention.

The following describes the theoretical basis of DCT-based video manipulation in connection with brightness and contrast adjustments but not limited thereto.

As aforementioned image processing may comprise brightness and contrast adjustment for instance but other techniques can be implemented as well in accordance with the inventive step of the present invention.

The theoretical basis of the compressed domain brightness and contrast adjustment is presented in this section. The following equations deduce the corresponding manipulations on DCT coefficients for brightness and contrast adjustment.

Brightness Adjustment

If the brightness is applied to the image I in the spatial domain, the new image I' will be defined as:

$$I'(i,j) = I(i,j) + K \quad (4)$$

where K is a constant representing the change of luminance intensity. The DCT Y'(n,m) of the edited frame I'(n,m) is given by:

$$Y'(n,m) = \frac{1}{4}C_n C_m \sum_{i=0}^{7}\sum_{j=0}^{7} I'(i,j) \cdot \cos\left(\frac{\pi \cdot n}{16}(2i+1)\right) \cdot \cos\left(\frac{\pi \cdot m}{16}(2j+1)\right)$$

$$Y'(n,m) =$$

$$\frac{1}{4}C_n C_m \sum_{i=0}^{7}\sum_{j=0}^{7} [I(i,j)+K] \cdot \cos\left(\frac{\pi \cdot n}{16}(2i+1)\right) \cdot \cos\left(\frac{\pi \cdot m}{16}(2j+1)\right)$$

$$Y'(n,m) = \frac{1}{4}C_n C_m \sum_{i=0}^{7}\sum_{j=0}^{7} I(i,j) \cdot \cos\left(\frac{\pi \cdot n}{16}(2i+1)\right) \cdot \cos\left(\frac{\pi \cdot m}{16}(2j+1)\right) +$$

$$\frac{1}{4}C_n C_m \sum_{i=0}^{7}\sum_{j=0}^{7} K \cdot \cos\left(\frac{\pi \cdot n}{16}(2i+1)\right) \cdot \cos\left(\frac{\pi \cdot m}{16}(2j+1)\right)$$

$$Y'(n,m) = Y(n,m) + \frac{1}{4}C_n C_m \sum_{i=0}^{7}\sum_{j=0}^{7} K \cdot \cos\left(\frac{\pi \cdot n}{16}(2i+1)\right) \cdot \cos\left(\frac{\pi \cdot m}{16}(2j+1)\right)$$

Note that for the AC coefficients for which n and m are both not zero, the second term on the RHS of equation (4) above vanishes to zero. However, for the DC coefficient for which n=m=0, it is equal to unity, i.e., $$Y'(0,0) = Y(0,0) + 8 \cdot K$$

Let $Y_q$ and $Y_q'$ be the quantized DC coefficients before and after brightness adjustment, $$Y_q'(0,0) = Y_q(0,0) + 8 \cdot K / Q_{DC}$$

Where $Q_{DC}$ is the quantization scale for DC coefficient.

Hence, equation (4) becomes:

$$Y_q'(n,m) = \begin{cases} Y_q(n,m) + 8 \cdot K/Q_{DC}; & m=n=0 \\ Y_q(n,m); & \text{else} \end{cases}$$

Thus, the value of the brightness adjustment in the compressed domain, K', is given by:

$$K' = \begin{cases} 8 \cdot K/Q_{DC}; & m = n = 0 \\ 0; & \text{else} \end{cases} \quad (5)$$

Contrast Adjustment

Consider the contrast adjustment equation given in the following equation:

$$I'(i,j) = \lambda \cdot (I(i,j) - \eta) + \eta \quad (6)$$

where $\eta$ is the average of the pixel intensities of the image and $\lambda$ is the contrast scaling factor.

Y'(n,m) of the edited image I'(i,j) is given by:

$$Y'(n, m) = \frac{1}{4} C_n C_m \sum_{i=0}^{7} \sum_{j=0}^{7} I'(i, j) \cdot \cos\left(\frac{\pi \cdot n}{16}(2i + 1)\right) \cdot \cos\left(\frac{\pi \cdot m}{16}(2j + 1)\right)$$

$$Y'(n, m) =$$

$$\frac{1}{4} C_n C_m \sum_{i=0}^{7} \sum_{j=0}^{7} [\lambda \cdot (I(i, j) - \eta) + \eta] \cdot \cos\left(\frac{\pi \cdot n}{16}(2i + 1)\right) \cdot \cos\left(\frac{\pi \cdot m}{16}(2j + 1)\right)$$

$$Y'(n, m) = \frac{1}{4} C_n C_m \sum_{i=0}^{7} \sum_{j=0}^{7} \lambda \cdot I(i, j) \cdot \cos\left(\frac{\pi \cdot n}{16}(2i + 1)\right) \cdot \cos\left(\frac{\pi \cdot m}{16}(2j + 1)\right) +$$

$$\frac{1}{4} C_n C_m \sum_{i=0}^{7} \sum_{j=0}^{7} \eta \cdot (\lambda - 1) \cdot \cos\left(\frac{\pi \cdot n}{16}(2i + 1)\right) \cdot \cos\left(\frac{\pi \cdot m}{16}(2j + 1)\right)$$

$$Y'(n, m) = Y(n, m) + \frac{\eta \cdot (\lambda - 1)}{4} C_n C_m$$

$$\sum_{i=0}^{7} \sum_{j=0}^{7} K \cdot \cos\left(\frac{\pi \cdot n}{16}(2i + 1)\right) \cdot \cos\left(\frac{\pi \cdot m}{16}(2j + 1)\right)$$

since $\eta$ is in pixel domain, a conversion to the corresponding compressed domain parameter is needed. The following deductions convert $\eta$ to its counterpart in compressed domain:

$$\eta = \frac{1}{8 \cdot 8 \cdot M_1 \cdot M_2} \sum_{x=0}^{M_1-1} \sum_{y=0}^{M_2-1} \sum_{i=0}^{7} \sum_{j=0}^{7} I(8x + i, 8y + j)$$

where $M_1$ and $M_2$ are the number of 8×8 blocks in the horizontal and vertical dimensions in the image.

Let $\eta_{x,y}'$ be the average of pixel intensity of an 8×8 block (x,y):

$$\eta = \frac{1}{M_1 \cdot M_2} \sum_{x=0}^{M_1-1} \sum_{y=0}^{M_2-1} \eta_{x,y}'$$

and, for each 8×8 block $$\eta_{x,y}' = \frac{1}{64} \sum_{i=0}^{7} \sum_{j=0}^{7} I_{x,y}(i, j)$$

$$\eta_{x,y}' = \frac{1}{64} \sum_{i=0}^{7} \sum_{j=0}^{7} \left( \frac{1}{4} \sum_{n=0}^{7} \sum_{m=0}^{7} C_n C_m Y_{x,y}(n, m) \cdot \cos\left(\frac{\pi \cdot n}{16}(2i + 1)\right) \cdot \cos\left(\frac{\pi \cdot m}{16}(2j + 1)\right) \right)$$

$$\eta_{x,y}' = \frac{1}{64} \sum_{n=0}^{7} \sum_{m=0}^{7} \left( Y_{x,y}(n, m) \cdot \frac{1}{4} C_n C_m \sum_{i=0}^{7} \sum_{j=0}^{7} \cos\left(\frac{\pi \cdot n}{16}(2i + 1)\right) \cdot \cos\left(\frac{\pi \cdot m}{16}(2j + 1)\right) \right)$$

$$\eta_{x,y}' = \frac{1}{64} \sum_{n=0}^{7} \sum_{m=0}^{7} Y_{x,y}(n, m) \cdot \Phi_{n,m}$$

where $$\Phi_{n,m} = \frac{1}{4} C_n C_m \sum_{i=0}^{7} \sum_{j=0}^{7} \cos\left(\frac{\pi \cdot n}{16}(2i + 1)\right) \cdot \cos\left(\frac{\pi \cdot m}{16}(2j + 1)\right)$$

Therefore, the RHS of $$Y'(n, m) =$$

$$\lambda \cdot Y(n, m) + \frac{\eta \cdot (\lambda - 1)}{4} C_n C_m \sum_{i=0}^{7} \sum_{j=0}^{7} \cos\left(\frac{\pi \cdot n}{16}(2i + 1)\right) \cdot \cos\left(\frac{\pi \cdot m}{16}(2j + 1)\right)$$

can be written as $$\frac{(\lambda - 1)}{M_1 \cdot M_2} \sum_{x}^{M_1-1} \sum_{y}^{M_2-1} \eta_{x,y}' \cdot \Phi_{n,m} =$$

$$\frac{(\lambda - 1)}{M_1 \cdot M_2} \sum_{x}^{M_1-1} \sum_{y}^{M_2-1} \left( \frac{1}{64} \cdot \sum_{n=0}^{7} \sum_{m=0}^{7} Y_{x,y}(n, m) \cdot \Phi_{n,m} \right) \cdot \Phi_{n,m}$$

$\Phi_{n,m}$ is the coefficient matrix of an 8×8 block with all one intensity. We have $\Phi_{0,0} = 8$, and $\Phi_{n,m} \approx 0$ for n,m≠0. The above equation can be rewritten as:

$$\frac{(\lambda - 1)}{M_1 \cdot M_2} \sum_{x}^{M_1-1} \sum_{y}^{M_2-1} \left( \frac{1}{64} \cdot Y_{x,y}(0,0) \cdot (\Phi_{n,m})^2 \right) = \frac{(\lambda - 1)}{M_1 \cdot M_2} \sum_{x}^{M_1-1} \sum_{y}^{M_2-1} Y_{x,y}(0,0)$$

$$= (\lambda - 1) \cdot \overline{Y_{DC}}$$

where $\overline{Y_{DC}}$ is the average of the DC coefficients of all the 8×8 blocks in the image.

The contrast adjustment in compress domain can be written as:

$$Y'(n,m) = \begin{cases} \lambda \cdot Y(n,m) + (\lambda-1) \cdot \overline{Y_{DC}} & m=n=0 \\ \lambda \cdot Y(n,m) & m \neq 0 \text{ or } n \neq 0 \end{cases} \quad (7)$$

Based on the above theoretical deduction, the brightness and contrast adjustment operations can be performed on DCT level. The followings are the details of the manipulations.

As mentioned above, there are two types of macroblocks in a frame, Intra-coded macroblock (Intra MB) and Inter-coded macroblock (Inter MB). In an Intra MB, the original pixels are encoded. In an Inter MB, to exploit the temporal redundancy, only the differences of the original pixel values and the motion compensated pixel values are encoded. Therefore, values in an Inter MB represent the change from the previous frame to the current frame.

Intra-Coded Macroblock (Intra-MB)

In an Intra MB, the original pixels are encoded. For the brightness adjustment, (5) and (7) can be applied to manipulate the DCT coefficients for brightness and contrast adjustment.

Brightness Adjustment:

Equation (5) shows that only the DC coefficient needs to change.

In the following sections 1) and 2) a H.263 and a MPEG-4 bitstreams are treated by the way of example.

1) H.263 Bitstream

In H.263, the DC quantizer is fixed to 8. Therefore, the amount of change in pixel intensity is exactly the same amount of change in DC coefficient.

2) MPEG-4 Bitstream

In MPEG-4, DC and AC prediction may be applied. The quantized DC value is subtracted by the prediction DC value from the upper or the left block before VLC (Variable Length Code) coding. The adaptive selection of the DC and AC prediction direction is based on comparison of the horizontal and vertical DC gradients around the block to be decoded. Due to the change of DC value by applying enhancement effects, DC prediction direction may be changed. On a block basis, the best direction (from among horizontal and vertical directions) for DC coefficient prediction is also used to select the direction for AC coefficients prediction. Therefore, the change in DC coefficient will affect the encoding of AC coefficients if AC prediction is applied. This issue may be solved by forcing the AC prediction off by setting the AC prediction flag as 0, in accordance with the inventive concept of the present invention. The AC coefficients after applying enhancement effects are VLC re-encoded.

Contrast Adjustment:

Equation (7) is applied to adjust the contrast level.

According to (7), the average of DC coefficients from all blocks in the frame is required. However, in common implementations, the blocks are processed one by one, and the bitstream is not allowed random accessing, i.e., in order to decode block i, blocks prior to i must be decoded first. Therefore, to obtain an accurate average of DC coefficients, a two-pass process is required. The first pass retrieves the DC coefficients of all blocks in a frame in order to calculate the average. The second pass applies the contrast adjustment.

Obviously, a two-pass process will increase the computational complexity. According to the present invention, a one-pass process is adopted. An approach to estimate the average DC coefficient by progressively adding the new DC coefficients will be applied. This approach is efficient and advantageously to implement. Said approach may consist of the following steps:

1. The initial average DC coefficient is set to 1024, which corresponds to the middle level of the intensity.
2. Before applying enhancement effects to an Intra MB, the average DC value is updated as follows:

$$\overline{Y_{DC}}(n) = \frac{\overline{Y_{DC}}(n-1)*(n+M)*4 + \sum_{i=0}^{3} Y_{DC}(n,i)}{(n+M+1)*4} \quad (8)$$

where $\overline{Y_{DC}}(n)$ is the estimated average DC coefficient for macroblock n, $Y_{DC}(n,i)$ is the DC coefficient of block i in macroblock n. M is the number of macroblocks in a frame.

3. Apply contrast adjustment to macroblock n, by plugging the estimated average DC coefficient $\overline{Y_{DC}}(n)$ into equation (7).

Inter-Coded Macroblock (Inter-MB)

In the brightness or the contrast adjustment, the enhancement effect is constantly applied to each frame in the video sequence. Therefore, in the brightness adjustment, changes of pixel intensities in the previous frame and the current frame are the same. The differences between the consecutive two frames remain unchanged. Hence, there's no need of any manipulation on the Inter-MB for the brightness adjustment.

In the case of contrast adjustment, each frame has the same stretching factor. The spatial domain representation of Inter MB contrast adjustment is given below:

Applying contrast adjustment on the frame at times t−1 and t, results in:

$$I'(i,j,t) = \lambda \cdot (I(i,j,t) - \eta(t)) + \eta(t)$$

$$I'(i,j,t-1) = \lambda \cdot (I(i,j,t-1) - \eta(t-1)) + \eta(t-1)$$

Let $\Delta I'(i,j,t) = I'(i,j,t) - I'(i,j,t-1)$ be the intensity difference between coding times t−1 and t after contrast adjustment. Let $\Delta I(i,j,t) = I(i,j,t) - I(i,j,t-1)$ be the intensity difference between coding time t−1 and t before contrast adjustment. The corresponding manipulation in spatial domain for Inter MB is:

$$\Delta I'(i,j,t) = \lambda \cdot [\Delta I(i,j,t) - (\eta(t) - \eta(t-1))] + (\eta(t) - \eta(t-1))$$

$$\Delta I'(i,j,t) = \lambda \cdot \Delta I(i,j,t) + (1-\lambda) \cdot [(\eta(t) - \eta(t-1))]$$

However the difference of average intensity between two consecutive frames, [η(t)−η(t−1)], is usually small, except in the case of scene change, in which case most macroblocks are Intra coded. The factor (1−λ) is usually a small value (less than 1). Therefore, the second term in the above equation can be ignored and the manipulation for Inter MB follows:

$$\Delta I'(i,j,t) = \lambda \cdot \Delta I(i,j,t)$$

A further object of the present invention is to decrease the shadow effect within the video sequence. The following section describes the shadow effect and a methodology to combat said effect in accordance with the present invention. Said method is provided in the compressed domain.

Shadow Effect:

When the compressed domain video enhancement is applied, a particular effect could be observed when changes occur in the region containing sharp edges called "shadow effect". The reason of the shadow effect is that clipping is applied when the video is played back.

In the digital video system, a pixel is represented by a certain number of bits. A popular representation is 8-bit. More specifically, the pixel luminance can have $2^8=256$ possible values (0~255). When applying the video enhancement effects, the resulting pixel values may be out of range, i.e. higher than 255 or lower than 0, a standard way is to restrict it within the range of 0~255. This process is called clipping.

In spatial domain video enhancement, this is not an issue since the clipping is applied to the fully decoded image sequence before it is re-encoded. The edited video bitstream does not contain any pixel that is out of the range.

In the compressed domain, the enhancement effect is applied in the DCT level, as already shown in FIG. 3. The DCT coefficients after editing may correspond to pixel values that are out of range. These values will be clipped in the decoding process.

The shadow effect is introduced by the clipping. Said shadow effect may occur in areas where sharp edges or changes are present, for instance white letters on a dark background or the like. Without shadow effect compensation each edge may have a disturbing shadow.

When a region contains a sharp edge, the luminance difference of the two adjacent areas is very large. Applying enhancement effect on this region may cause the pixel in one portion of this region to be out of range, while the other portion of the region may still be within range. In an example, pixels of the digits (or letters) are white, which corresponds to a value close to 255. On the other hand, the background pixels are black, which corresponds to a value close to 0. When the brightness is adjusted by a positive value, the pixels of the white digits will be larger than 255, while the background black pixels will be still within range. When clipping is applied in the decoding process, the out-of-range pixels will be clipped while the others will remain the same. In the next frame, if the blocks in this region are inter-coded, only differences between consecutive frames are restored. These residuals are not compensated for the clipping in the previous frame. Therefore, when the residuals are added to the previous frame, the pixels reconstructed from the clipped pixels in the previous frame will show darker or lighter than their designated luminance levels.

A suggestion for solving this problem, in accordance with the inventive concept of the present invention, is to compensate the residuals when the out-of-range pixels are detected in the previous frame. Since the DCT coefficients are directly manipulated without fully decoding, the out-of-range pixels in spatial domain cannot be identified. A corresponding detection in DCT level can be used. This can be done by setting thresholds for DC coefficient and some AC coefficients. When the DC coefficient is too large or too small, and the absolute of AC coefficients are large, it usually means the block contains sharp contrasting edge and some of the pixels are almost out of range and will certainly be out of range when applying enhancement effects. In this case, this block will be fully decoded and stored. In the next frame, residuals corresponding to this block will be compensated and re-encoded.

This method needs full decoding and re-encoding of some blocks. However, it is only applied to the blocks containing out-of-range pixels. In real video sequences, this situation does not happen often. Therefore, this corrective measure will not increase the computational complexity significantly.

With reference to FIG. 4 a module M400 for image processing of a compressed DCT-based video sequence is depicted. Said module comprises two main components: a component for providing a compressed DCT-based video sequence M410 and a component for performing an image processing operation M410 in accordance with the present invention. Both components are connected together so that the output of M410 corresponds to the input of said image processing component M420. The component for providing M410 receives a video sequence represented by a digital data stream and is adapted for transforming the raw image data into a DCT-based and compressed video sequence. This data may be used as an input for M420 corresponding to the image processing component.

After performing said image processing operation the date may be provided for further usage or stored in a memory component, for instance. The basis of the image processing module or component M420 has been previously described with reference to the accompanied figures.

FIG. 5 illustrates principal structural components of a portable consumer electronic (CE) or a mobile device, respectively 550, which should exemplarily represent any kind of portable consumer electronic (CE) device employable with the present invention. It should be understood that the present invention is neither limited to the illustrated CE device 550 nor to any other specific kind of portable CE device.

The illustrated portable CE device 550 is exemplarily carried out as a camera phone, which designates typically a cellular phone with image and video clip capturing capability by the means of an image capturing sensor. In particular, the device 550 is embodied as a processor-based or micro-controller based device comprising a central processing unit (CPU), a data storage 520, an application storage (not shown), cellular communication means including cellular radio frequency interface (I/F) 580 with radio frequency antenna 500 and subscriber identification module (SIM) 570, user interface input/output means including audio input/output (I/O) means 540 (typically microphone and loudspeaker), keys, keypad and/or keyboard with key input controller (Ctrl) (not shown) and a display with display controller (Ctrl) (not shown), an image capturing sensor 510 including typically a CCD (charge-coupled device) sensor (not shown) with optics (not shown) for image projection, and an image processing module M400 (see also FIG. 4) representing exemplarily an implementation of several dependent and independent modules and components required for image handling in accordance with the present invention.

The operation of the CE device 550 is controlled by the central processing unit (CPU) typically on the basis of an operating system or basic controlling application controlling the features and functionality of the CE device by offering their usage to the user thereof. The display and display controller (Ctrl) are controlled by the central processing unit (CPU) and provides information for the user. The keypad and keypad controller (Ctrl) are provided to allow the user to input information. The information input via the keypad is supplied by the keypad controller (Ctrl) to the central processing unit (CPU), which may be instructed and/or controlled in accordance with the input information. The audio input/output (I/O) means 540 includes at least a speaker for reproducing an audio signal and a microphone for recording an audio signal. The central processing unit (CPU) may control the conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry.

Additionally, the portable CE device 550 according to a specific embodiment illustrated in FIG. 5 includes optionally the cellular interface (I/F) 580 coupled to the radio frequency antenna 500 and is operable with the subscriber identification module (SIM) 570. The cellular interface (I/F) 580 is arranged as a cellular transceiver to receive signals from the cellular antenna, decodes the signals, demodulates them and also reduces them to the base band frequency. The cellular interface 580 provides for an over-the-air interface, which serves in conjunction with the subscriber identification module (SIM) 570 for cellular communications with a corresponding base station (BS) of a radio access network (RAN) of a public land mobile network (PLMN). The output of the cellular interface (I/F) 580 thus consists of a stream of data that may require further processing by the central processing unit (CPU). The cellular interface (I/F) 580 arranged as a cellular transceiver is also adapted to receive data from the central processing unit (CPU), which is to be transmitted via the over-the-air interface to the base station (BS of the radio access network (RAN). Therefore, the cellular interface (I/F) 580 encodes, modulates and up converts the data embodying signals to the radio frequency, which is to be used. The cellular antenna then transmits the resulting radio frequency signals to the corresponding base station (BS) of the radio access network (RAN) of the public land mobile network (PLMN).

The image capturing sensor 510 is typically implemented by the means of a CCD (charge-coupled device) and optics. Charge-coupled devices containing grids of pixels are used for digital image capturing in digital cameras, digital optical scanners, and digital video cameras as light-sensing devices. An image is projected by optics (a lens or an arrangement of one or more lenses) on the capacitor array (CCD), causing each capacitor to accumulate an electric charge proportional to the light intensity at that location. A two-dimensional array, used in digital video and digital still cameras, captures the whole image or a rectangular portion of it. Once the array has been exposed to the image, a control circuit causes each capacitor to transfer its contents to its neighbor. The last capacitor in the array dumps its charge into an amplifier that converts the charge into a voltage. By repeating this process, the control circuit converts the entire contents of the array to a varying voltage, which it samples, digitizes, and provides the raw image data for further handling by the image processing module M400. The image processing module M400 enables the user of the CE device 550 to shoot still digital images and video sequences. Conventionally, the raw image data is compressed by the image processing module M400 and stored in the data storage. The image processing module M400 implements among others the codecs, i.e. coding and encoding modules required for still digital image processing and video (image sequence) processing, where the implemented components of the image processing module M400 are preferably software application components, which operation may be supported by specific hardware implementation, which is advantageous to improve processing capability and functionality of the image processing module M400.

Even though the invention is described above with reference to embodiments according to the accompanying drawings, it is clear that the invention is not restricted thereto but it can be modified in several ways within the scope of the appended claims.

What is claimed is:

1. A method comprising:
   providing a compressed, motion compensated discrete cosine transform-based video sequence; and
   applying an image processing operation via a processing component on said video sequence in compressed domain resulting in an image processed, compressed video sequence,
   wherein said applying is executed by adjusting discrete cosine transform-components defining said discrete cosine transform-based video sequence and said image processing operation comprises applying at least one of contrast adjustment and brightness adjustment, and
   wherein shadow effect compensation is provided on the basis of said applying of said image processing of said discrete cosine transform-based video sequence.

2. The method according to claim 1, wherein said adjusting of discrete cosine transform-components is provided by partial decoding and encoding said discrete cosine transform-based video sequence.

3. The method according to claim 1, wherein said shadow compensation is provided by compensating residuals when out-of-range pixels are detected in a previous frame.

4. The method according to claim 3, wherein said out-of-range pixels are detected in the discrete cosine transform-based video sequence by setting thresholds for direct current and alternating current coefficients.

5. The method according to claim 3, wherein said shadow effect compensation is provided by partially decoding of certain blocks of the frame, where a possibility for out-of-bound coefficients exists.

6. The method according to claim 1, wherein said video sequence is a digital H.263 bit-stream representing said sequence, wherein the H.263 bit-stream is variable length code decoded, discrete cosine transform coefficients in the bit-stream are de-quantized, and the image processing operations are applied to the discrete cosine transform coefficients.

7. The method according to claim 1, wherein an amount of change in pixel intensity is exactly the same amount of change in direct current coefficient by applying said brightness adjustment of said sequence for intra-coded macroblocks if said sequence corresponds to said H.263 bit-stream.

8. The method according to claim 1, wherein said video sequence is a digital MPEG-4 bit-stream representing said sequence, wherein the MPEG-4 bit-stream is variable length code decoded, discrete cosine transform coefficients in the bit-stream are de-quantised, and the image processing operations are applied to the discrete cosine transform coefficients.

9. The method according to claim 1, wherein said contrast adjustment in said sequence represented by said MPEG-4 bit-stream is provided as a one-pass process for intra-coded macroblocks.

10. A computer readable medium stored with computer program code, which, when executed by a processor of an apparatus, cause said apparatus to at least perform
   providing a compressed, motion compensated discrete cosine transform-based video sequence; and
   applying an image processing operation on said video sequence in compressed domain resulting in an image processed, compressed video sequence,
   wherein said applying is executed by adjusting discrete cosine transform-components defining said discrete cosine transform-based video sequence and said image processing operation comprises applying at least one of contrast adjustment and brightness adjustment, and
   wherein shadow effect compensation is provided on the basis of said applying of said image processing of said discrete cosine transform-based video sequence.

11. A module comprising:
   a component configured to provide a compressed, motion compensated discrete cosine transform-based video sequence; and a component for applying said image processing operation on said video sequence in compressed domain resulting to an image processed, compressed video sequence, wherein said applying is executed by adjusting of discrete cosine transform-components defining said discrete cosine transform-based video sequence and said image processing operation comprises applying at least one of contrast adjustment and brightness adjustment, and wherein shadow effect compensation is provided on the basis of said applying of said image processing of said discrete cosine transform-based video sequence.

12. The module according to claim 11, wherein said contrast adjustment is based on the following expression:

$$Y'(n,m) = \begin{cases} \lambda \cdot Y(n,m) + (\lambda - 1) \cdot \overline{Y_{DC}} & m = n = 0 \\ \lambda \cdot Y(n,m) & m \neq 0 \text{ or } n \neq 0 \end{cases} \quad (7)$$

where:
- m,n are frequency domain coordinates;
- Y'(n,m) is the discrete cosine transform transformation of the edited image;
- $\lambda$ is a contrast scaling factor;
- Y(n,m) is the discrete cosine transform transformation of the original image; and
- $\overline{Y_{DC}}$ is the average of the direct current coefficients of all blocks within the image.

13. The module according to claim 11, wherein said brightness adjustment is based on the following expression:

$$Y'_q(n,m) = \begin{cases} Y_q(n,m) + K'; & m = n = 0 \\ Y_q(n,m); & \text{else} \end{cases}$$

wherein K' corresponds to the value of the brightness adjustment in the compressed domain and it is given by:

$$K' = \begin{cases} 8 \cdot K / Q_{DC}; & m = n = 0 \\ 0; & \text{else} \end{cases} \quad (5)$$

where:
- m,n are frequency domain coordinates;
- Y'$_q$(n,m) is the discrete cosine transform transformation of the edited image;
- Y$_q$(n,m) is the discrete cosine transform transformation of the original image; and
- Q$_{DC}$ is the quantization scale for direct current coefficient.

14. The module according to claim 11, wherein said video sequence is a digital MPEG-4 bit-stream representing said sequence, wherein the MPEG-4 bit-stream is variable length code decoded, discrete cosine transform coefficients in the bit-stream are de-quantised, and the image processing operations are applied to the discrete cosine transform coefficients.

15. The module according to claim 11, wherein said contrast adjustment in said sequence represented by said MPEG-4 bit-stream is provided as one-pass process for intra-coded macroblocks.

16. An apparatus comprising:
at least one memory including computer program code; and
at least one processor
the at least one memory and the computer program code configured to, with the at least one processor, cause the apparatus to at least perform:
providing a compressed, motion compensated discrete cosine transform-based video sequence; and
applying an image processing operation on said video sequence in compressed domain resulting in an image processed, compressed video sequence,
wherein said applying is executed by adjusting discrete cosine transform-components defining said discrete cosine transform-based video sequence and said image processing operation comprises applying at least one of contrast adjustment and brightness adjustment, and
wherein shadow effect compensation is provided on the basis of said applying of said image processing of said discrete cosine transform-based video sequence.

* * * * *